3,326,836
TRACE EMULSIFIER LATICES CONSISTING OF AN INTERPOLYMER OF AN ALPHA-BETA ETHYLENICALLY UNSATURATED CARBOXYLIC ACID, AN ALKYL ACRYLATE AND EITHER STYRENE OR ACRYLONITRILE
Walter C. Snyder, Freeport, and George H. Morgan, Lake Jackson, Tex., assignors to The Dow Chemical Company, Midland, Mich., a corporation of Delaware
No Drawing. Filed Jan. 11, 1963, Ser. No. 250,755
12 Claims. (Cl. 260—29.6)

This invention relates to stable synthetic latexes and more particularly to stable synthetic latexes which, when dried, provide a polymer which has a high degree of water resistance and to a process for providing such a latex.

It has been recognized in the prior art that the emulsifiers required in preparing latexes contribute to certain problems occurring in the end use of the latexes such as decreased water resistance and lack of clarity in the dried polymer therefrom. Accordingly, numerous efforts have been made to prepare stable latexes which are emulsifier-free with some measure of success. However, such emulsifier-free latexes then have other deficiencies such as lack of mechanical stability, lack of freeze-thaw stability, large particle sizes and often the processes require large amounts of catalysts, or require excessively long periods for preparation. Latexes have even been prepared having monomer compositions related to those used in this invention, but such prior art materials have been prepared with amounts of emulsifiers generally ranging from 0.5 to 8 percent; such latexes do not have the desirable community of properties including water resistance provided by the products of this invention.

From the teachings and practice of the prior art it has not been contemplated that when the latex recipe comprises the monomer composition of this invention and an amount of a water-soluble emulsifier (predominantly of the anionic type) within the range of from about 0.004 percent to about 0.1 percent, based on the weight of the monomers, aqueous emulsion polymerization produces latexes having a surprisingly advantageous community of properties. Such long-sought combination of properties include, as to the latex, good coatings application properties (i.e. spreadability, flow and leveling), excellent mechanical stability, freeze-thaw stability, remarkable stability to heat and to the addition of acids, alkalies, and salts of monovalent metals and, as to the dried product from the latex, excellent adhesion to fibrous or metallic substrates and a high degree of water resistance.

It is an object of this invention to provide compositions of matter having a combination of desirable properties. It is a further object to provide latexes which are stable to mechanical shear. It is a still further object to provide latexes which are resistant to the addition of acids, alkalies, monovalent metal salts, and water-soluble organic solvents. An additional object is to provide a latex having freeze-thaw stability. It is yet another object to provide latexes which may be dried on a substrate and which have good adhesion thereto. Yet another object is to provide a latex composition which when dried has excellent water resistance. Other objects will be apparent from the description of the invention which follows:

The foregoing objects are obtained by copolymerizing monomers comprising from about 1 to about 10 percent, preferably from about 2 to about 5 percent, based on the total weight of the monomers, of an α-β-ethylenically unsaturated carboxylic acid having from 3 to 6 carbon atoms; and at least one ethylenically unsaturated ester selected from the group consisting of the cyclohexyl esters and the alkyl esters of acrylic acid and of methacrylic acid in which the alkyl esters have from 1 to 18 carbon atoms in the alkyl radical; in an aqueous system comprising from about 0.004 to about 0.1 percent, based on the weight of the monomers, of an anionic emulsifier, wetting agent, surfactant, and the like (hereinafter called emulsifier for brevity). Other monovinylidene monomers of the formula

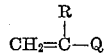

in which R is selected from the group consisting of hydrogen and methyl and Q is selected from the class consisting of the radical —CN and an aromatic hydrocarbon radical having from 6 to 12 carbon atoms, may be included as copolymerizable monomers.

While smaller proportions can be used, one or more of the esters of acrylic and of methacrylic acids usually are copolymerized in amounts greater than about 15 percent and often greater than about 20 percent by weight, based on the total weight of the copolymer, to provide the latex of this invention.

Typical of the interpolymerizable esters of acrylic acid and of methacrylic acid are methyl acrylate, ethyl acrylate, propyl acrylate, isopropyl acrylate, butyl acrylate, isobutyl acrylate, sec.-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, n-amyl methacrylate, isoamyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate or methacrylate or other alkoxyethyl acrylates or methacrylates, methyl methacrylate, ethyl methacrylate, propyl methacrylate, isopropyl methacrylate, butyl methacrylate, isobutyl methacrylate, sec.-butyl methacrylate, tert.-amyl methacrylate, cyclohexyl acrylate, cyclohexyl methacrylate, tert.-butyl acrylate, and tert.-amyl acrylate.

Exemplary of the other monovinylidene monomers which may be copolymerized with the esters described above are styrene, α-methylstyrene, vinyltoluene, vinylxylene, isopropylstyrene, tert.-butylstyrene, ethyl vinylbenzene, acrylonitrile, methacrylonitrile and the like.

Typical of the α,β-unsaturated carboxylic acids applicable in the preparation of the instant latexes are itaconic, citraconic, fumaric, and maleic acids and, particularly, acrylic and methacrylic acids and the like.

The quantity of water-soluble emulsifier is critical to the practice of this invention. The advantageous products of this invention are obtained with the specified monomer composition when the amount of the emulsifier is from about 0.004 part to about 0.1 part per 100 parts monomers used in the preparation of the latex. Especially valuable products are obtained when the amount is from about 0.02 part to about 0.08 part per 100 parts of monomer. Anionic surfactants, such as are known to the art, are necessary as emulsifiers in the practice of this invention. Although non-ionic emulsifiers may be used as partial substitution for the anionic emulsifier, it is preferred that at least a predominant proportion should be of the anionic type.

The anionic emulsifier may be selected from the alkyl aryl sulfonates, the alkali metal alkyl sulfates, the sulfonated alkyl esters, the fatty acid soaps, and the like. Specific examples of these well-known emulsifiers, for the purpose of illustration and not for limitation are sodium butylnaphthalene sulfonate, sodium lauryl sulfate, disodium dodecyldiphenyl ether disulfonate, N-octadecyl disodium sulfosuccinamate, dihexyl sodium sulfosuccinate and dioctyl sodium sulfosuccinate.

As polymerization catalysts there may be used one or more peroxides which are known to act as free radical catalysts and which are water soluble. Usually convenient are the persulfates (including ammonium, sodium and potassium persulfate), hydrogen peroxide or the perborates or percarbonates. There may also be used organic peroxides either alone or in addition to an inorganic peroxide compound. Typical organic peroxides include benzoyl peroxide, tert.-butyl hydroperoxide, cumene peroxide, acetyl peroxide, caproyl peroxide, tert.-butyl perbenzoate, tert.-butyl diperphthalate, methyl ethyl ketone peroxide and the like. The usual amount of catalyst required is roughly from about 0.01 percent to about 3.0 percent by weight, based on the weight of the monomer mixture.

In some instances, in order to effect interpolymerization at a temperature below that at which coagulation of the latex might occur, it may be desirable to activate the catalyst. The activation may be best accomplished by using a redox system in which a reducing agent within the limits of about 0.001 percent to about 6.0 percent, as based on the weight of the mixture of monomers, is present in addition to the peroxide catalyst. Many examples of such redox systems are known. Agents such as hydrazine or a soluble oxidizable sulfoxy compound, including the alkali metal salts of hydrosulfites, sulfoxalates, thiosulfates, sulfites and bisulfites and the like can be employed. Redox systems may be activated by the presence of a small amount (a few parts per million) of polyvalent metal ions. Ferrous ions are commonly and effectively used, or a tertiary amine which is soluble in the reaction medium may also be used as an activator.

Copolymerization of the various suggested monomers to produce the interpolymer latexes ordinarily is carried out at a temperature between about 70° and about 98° C., preferably between about 78° and about 88° C. However, when catalyst activators are used as discussed supra, lower temperatures are effective. Often the temperature is maintained at 80° or 85° C. until most of the monomers have been converted to interpolymer, then the temperature is increased a predetermined amount up to about 98° C. During interpolymerization, the temperature may be controlled in part by the rate at which the monomers are supplied and interpolymerized and/or by applied cooling.

As taught in the art, emulsion polymerization may be performed batchwise or continuously. It is possible to work entirely batchwise, emulsifying the entire charge of monomers and proceeding with polymerization. It is usually advantageous, however, to start with part of the monomers which are to be used and add the remainder of the monomer or monomers as polymerization proceeds. An advantage of gradual monomer addition lies in reaching a high solids content with optimum control and with maximum uniformity of product.

The emulsion polymerization process for preparing the interpolymer latexes of the present invention may commence with the addition of a polymerization catalyst to the aqueous reaction vehicle in a suitably equipped reaction vessel while purging the reaction atmosphere with an inert gas, such as nitrogen or methane. When the contents of the reactor reach the predetermined temperature of polymerization as discussed supra, the gradual addition of the monomer mixture is started and continued until the aqueous phase becomes hazy or cloudy. The cloudy coloration of the aqueous phase may appear at any point during the admixing of between about 3 to 5 percent of the total monomer charge.

At this stage of the emulsion polymerization process, the water-soluble emulsifier may be added to the reaction mixture or alternatively the emulsifier may be included in the aqueous phase before addition of any of the monomer. After the addition of the emulsifier, the balance of monomers may be introduced while continuing polymerization to bring the content of dispersed interpolymer to from about 5 percent to about 60 percent of the total dispersion, preferably to from about 45 percent to about 55 percent by weight. Interpolymerization should be carried on while the predetermined temperature is maintained until no more than a few percent of monomers remain in the mixture. This can frequently be achieved in approximately 3 to 4 hours.

When all of the monomer mixture has been added to the continuous aqueous phase, the interpolymer latex is generally allowed to further interpolymerize without upsetting the reaction conditions by the addition of more ingredients. This uninterrupted reaction period is generally referred to in emulsion polymerization processes as the digestion stage. It usually assists the attainment of the desired interpolymer latex in good yield.

This digestion stage is usually continued for approximately one to two hours. It may be most conveniently performed while maintaining the temperature within a range of from about 80° C. to about 90° C.

Agitation usually is required to form the dispersion initially and to maintain the dispersion throughout polymerization. The rate of agitation to be used in any particular instance will be dependent primarily on the overall design of the polymerization equipment. Near the minimum amount of agitation required to form and to maintain the dispersion is usually to be desired although the precise rate is not critical.

Before cooling the aqueous interpolymer latex dispersion, the media may be rendered mildly alkaline in a pH range of from about 8 to about 9.5. This may be done by adding ammonia or a water-soluble amine, or an inorganic base, such as potassium or ammonium hydroxide, or a mixture thereof. Ammonium hydroxide, usually giving the best results in the least complicated way, is often preferred.

The aqueous interpolymer latex dispersion having been permitted to cool to room temperature, the interpolymer latex product then may be separated from undesirable impurities by filtering the latex globules through a stainless steel filter having the filter surface perforated to correspond with the standard 100 mesh size of the U.S. Standard Sieve Series.

The interpolymer latices, prepared by the process described above, containing between about 5 and about 60 weight percent latex solids, having a specific gravity of about 1.00 to about 1.08 can be commingled with small amounts of thickening agents, colloidal stabilizers, antifoaming agents, preservatives, pigments, pigment extenders and plasticizers, if desired. To these instant formulated acrylic latex compositions may also be added, as a stabilizing agent, sufficient ammonium hydroxide to adjust the pH of the latex to from about 8.0 to 9.5 to assure adequate shelf life of the compositions, if any of the additaments should tend to partially acidify the formulation.

The following examples are given to illustrate more clearly the principle and practice of this invention to those skilled in the art and are not for the purpose of limitation. All parts and percentages are by weight unless otherwise indicated.

EXAMPLE 1

Into a reaction vessel equipped with a means for stirring, purging, refluxing and temperature control were placed 112.8 parts of water and 0.039 part of dioctyl sodium sulfosuccinate (as 0.065 part of a 60 percent solution in isopropanol and water). The temperature was raised to 85° C. whereupon 0.131 part of sodium persulfate was added and the system was purged with methane. The monomer solution consisting of about 56.1 parts of ethyl acrylate, about 34.3 parts of methyl methacrylate, about 5.8 parts of butyl acrylate and about 3.8 parts of methacrylic acid was added continuously and dropwise over a ninety-minute period while the contents of the reactor were being stirred at about 120 r.p.m. The temperature was maintained at about 85° C. and stirring was continued for one hour after the completion of the addition of the monomer solution. There was obtained a stable latex having a pH between 2.1 and 2.4, an average particle size of 1480 angstroms and a solids content of 46.5 percent.

The latex product passed the following stability tests:
(a) 30 minutes of stirring in a Hamilton Beach mixer;
(b) 5 freeze-thaw cycles;
(c) addition of an equal volume of an aqueous solution of 5 percent by weight of sodium chloride;
(d) addition of 20 parts by weight of ethylene glycol n-butyl ether per 100 parts by weight of latex; and
(e) addition of alkali metal hydroxide solutions until the pH of the latex was raised to 9.5.

A dried film of this latex, when exposed to liquid water for one hour, showed substantially no change such as whitening or loss of adhesion to a metal panel.

EXAMPLE 2

Another latex was prepared in the same manner as Example 1 with the following recipe.

| Material: | Parts by weight |
|---|---|
| Water | 112.8 |
| Dioctyl sodium sulfosuccinate solution | [1] 1.065 |
| Sodium persulfate | 0.131 |
| Ethyl acrylate | 40.4 |
| Butyl acrylate | 5.8 |
| Styrene | 50.0 |
| Methacrylic acid | 3.8 |

[1] .039 active.

The temperature was maintained at 85° C. and stirring was continued for 2 hours after completion of the monomer addition rather than for one hour as in Example 1. A stable latex was obtained having a pH in the range of 2.4 to 2.8, an average particle size of 1480 angstroms and a solids content of 46.0 percent.

The latex product passed the following stability tests:
(a) 30 minutes of stirring in a Hamilton Beach mixer;
(b) 5 freeze-thaw cycles;
(c) addition of an equal volume of an aqueous solution of 5 percent by weight of sodium chloride;
(d) addition of 20 parts by weight of ethylene glycol n-butyl ether per 100 parts by weight of latex; and
(e) addition of alkali metal hydroxide solutions until the pH of the latex was raised to 9.5.

A thin layer of this latex was heated to facilitate drying and film formation. The dried film, when exposed to liquid water for one hour, showed substantially no change.

EXAMPLE 3

A latex was prepared by the procedure of Example 2 from the following.

| Material: | Parts by weight |
|---|---|
| Water | 105 |
| Dioctyl sodium sulfosuccinate solution | [1] .0066 |
| Sodium persulfate | .015 |
| 3-methylhexyl methacrylate | 97.0 |
| Methacrylic acid | 3.0 |

[1] .004 active

The product obtained was a stable latex having a pH in the range of 2.4 to 2.8, an average particle size of 1620 angstroms and a solids content of 46.5 percent.

EXAMPLE 4

A film-forming latex was prepared according to the procedure of Example 2 from the following recipe.

| Material: | Parts by weight |
|---|---|
| Water | 106.0 |
| Dioctyl sodium sulfo-succinate solution | [1] 0.099 |
| Sodium persulfate | 0.147 |
| Butyl acrylate | 62.7 |
| Acrylonitrile | 34.3 |
| Methacrylic acid | 3.0 |

[1] .059 active.

The product obtained was a stable latex having a pH in the range of 2.4 to 2.8, an average particle size of 1300 angstroms and a solids content of 46.5 percent.

The latex product passed the following stability tests:
(a) 30 minutes of stirring in a Hamilton Beach mixer;
(b) 5 freeze-thaw cycles;
(c) addition of an equal volume of an aqueous solution of 5 percent by weight of sodium chloride;
(d) addition of 20 parts by weight of ethylene glycol n-butyl ether per 100 parts by weight of latex; and
(e) addition of alkali metal hydroxide solutions until the pH of the latex was raised to 9.5.

EXAMPLE 5

Another latex was prepared by the same procedure and with the same ingredients as Example 4 except that 0.059 part of disodium dodecylidiphenyl ether disulfonate (as 1.33 parts of an aqueous solution) was substituted for the dioctyl sodium sulfosuccinate solution. The product was a latex having a particle size of 1200 angstroms and substantially the same properties as the latex of Example 4.

EXAMPLE 6

A trace emulsifier latex was prepared from a monomer composition consisting of 58.3 parts ethyl acrylate, 37.7 parts methyl methacrylate and 4 parts methacrylic acid by the procedure of Example 2. However, 0.0068 part of the solution of dioctyl sodium sulfosuccinate (about 0.004 part active material) was used rather than the amount shown for the cited example. The product was a stable latex having a pH in the range of 2.1 to 2.4, an average particle size of 1900 angstroms, and a solids content of 46.5 percent.

EXAMPLE 7A

By using the procedure of Example 2 a latex was prepared from a monomer composition of 52.0 parts of ethyl acrylate, 38.4 parts of methyl methacrylate, 5.8 parts of butyl acrylate and 3.8 parts of methacrylic acid. As emulsifier, there was used 0.065 part of the solution of dioctyl sodium sulfosuccinate (.039 part, active).

The product was a latex having a pH between 2.1 and 2.4, an average particle size of 1350 angstroms and a solids content of 46.5 percent.

Latex 7B

For comparison with the above advantageous product of this invention, there was prepared a latex using the same procedure and the same ingredients in the same proportions as in Example 7A except that no emulsifier was included. The product (hereinafter called Latex 7B) was a latex having a pH between 2.1 and 2.4, an average particle size of 3800 angstroms and a solids content of 46.5 percent. Latex 7B is a product outside the scope of this invention.

Latex 7C

For a further comparison with products of this invention, another latex was prepared using the same procedure and the same ingredients in the same proportions as in Example 7A and in Latex 7B except that 0.66 part of the solution of dioctyl sodium sulfosuccinate (about 0.40 part active) was used per 100 parts of total monomer charged. The product (hereinafter called Latex 7C) was a latex having a pH between 2.1 and 2.4, an average particle size of 1000 angstroms and a solids content of about 45 percent. Latex 7C is also outside the scope of this invention.

The latex products of Examples 3, 4, 6 and 7A were tested for water resistance with the results shown in Table I. Latex 7B and Latex 7C, each having the monomer composition required for this invention but having a quantity of emulsifier outside the scope of this invention, were tested in the same manner. In carrying out this test, panels were prepared by spraying or casting with a wire-wound rod each latex on a cleaned metal panel. After being allowed to dry for at least 18 hours, the coating adhering to the panel was about 1 mil thick. The coated portion of the panel was then inserted into a distilled water bath maintained at 100° F. The panels were examined after each of the predetermined time periods, then they were reinserted into the bath until the next examination. The condition of the coated panels was rated in four classifications (general appearance, whitening of the coating, blistering of the film and rusting of the panel) after 4, 24 and 168 hours of exposure with further composite ratings at 336 hours and 720 hours exposure. The rating scale ranged from 0 to 10, wherein the rating of 10 was perfect, i.e., no noticeable change in the coated area of the panel.

by weight of at least one ethylenically unsaturated ester selected from the group consisting of the cyclohexyl esters and the alkyl esters of acrylic acid and of methacrylic acid, the said alkyl esters having from 1 to 18 carbon atoms in the alkyl radical, and any balance of the monomer composition consisting of at least one monovinylidene monomer of the formula $$CH_2=C-Q$$
$$|$$
$$R$$

wherein R is selected from the group consisting of hydrogen and methyl and Q is selected from the class consisting of the radical —CN and an aromatic

TABLE I.—WATER RESISTANCE TEST OF LATEX ON METAL PANELS

| Latex Designation | Percent Emulsifier (active basis) | 4 Hours | | | | 24 Hours | | | | 168 Hours | | | | 336 Hours, GA | 720 Hours, GA |
|---|---|---|---|---|---|---|---|---|---|---|---|---|---|---|---|
| | | GA | W | B | R | GA | W | B | R | GA | W | B | R | | |
| Example 3 | 0.004 | 10 | 10 | 10 | 10 | 10 | 10 | 10 | 10 | 9 | 8 | 10 | 9 | 8 | 8 |
| Example 4 | 0.059 | 10 | 10 | 10 | 10 | 9 | 7 | 10 | 9 | 8 | 6 | 10 | 9 | 6 | 6 |
| Example 6 | 0.004 | 8 | 7 | 10 | 10 | 7 | 6 | 10 | 9 | 6 | 5 | 9 | 9 | 6 | 6 |
| Example 7A | 0.039 | 8 | 7 | 10 | 10 | 7 | 6 | 10 | 9 | 6 | 5 | 9 | 9 | 6 | 6 |
| Latex 7B* | None | 7 | 6 | 10 | 10 | 6 | 4 | 10 | 9 | 5 | 3 | 8 | 9 | 5 | 5 |
| Latex 7C* | 0.40 | 0 | ------ | ------ | ------ | 0 | ------ | ------ | ------ | 0 | ------ | ------ | ------ | 0 | 0 |

*Not a latex of this invention.
GA = General Appearance; W = Whitening; B = Blistering; R = Rusting.

These results show that even with the monomer composition of this invention, Latex 7C (which had a greater amount of emulsifier than that disclosed as effective for the purposes of this invention) completely failed the water resistance test. On the other hand, Latex 7B (which differed from the latexes of the invention in that it had no emulsifier) showed inferior results in all four categories and at each time interval compared to a latex of this invention having the same monomer composition but prepared with an amount of emulsifier within the scope disclosed herein.

Thus it can be seen that the full combination of this invention, i.e., the prescribed monomer composition and the disclosed emulsifier requirements, is necessary to obtain the advantageous properties provided by the invention.

When there is substituted for the methacrylic acid of the above examples of the invention, acrylic acid, fumaric acid, itaconic acid, maleic acid, and mixtures thereof, substantially the same results are obtained.

Similarly, substantially the same results are obtained as to stability of the latexes and water resistance of the dried products therefrom when other alkyl esters or cyclohexyl esters of acrylic acid and of methacrylic acid are substituted for the esters of the above examples and when methacrylonitrile, α-methylstyrene, vinyltoluene, vinyl xylene, isopropyl styrene, t-butyl styrene and ethyl vinylbenzene are substituted for the styrene and the acrylonitrile of the foregoing examples.

The products of this invention are especially useful for the preparation of coating materials, especially paints for metals. They may be used advantageously in exterior metal furniture coatings, industrial finishes for metal equipment and in maintenance paints for metal surfaces.

What is claimed is:
1. The process for preparing a stable, aqueous latex which provides a polymer when dried which has a high degree of water resistance by subjecting to conditions conducive to polymerization an aqueous mixture comprising:
   (1) a free-radical producing catalyst;
   (2) a monomer composition consisting of from about 1 to about 10 percent by weight of an α,β-ethylenically unsaturated carboxylic acid, from 15 to 99 percent by weight of at least one ethylenically unsaturated ester selected from the group consisting of the cyclohexyl esters and the alkyl esters of acrylic acid and of methacrylic acid, the said alkyl esters having from 1 to 18 carbon atoms in the alkyl radical, and any balance of the monomer composition consisting of at least one monovinylidene monomer of the formula

$$CH_2=C-Q$$
$$|$$
$$R$$

wherein R is selected from the group consisting of hydrogen and methyl and Q is selected from the class consisting of the radical —CN and an aromatic hydrocarbon radical having from 6 to 12 carbon atoms; and
   (3) a water-soluble emulsifier, predominantly of the anionic type, in an amount of from about 0.004 to about 0.1 percent by weight as the sole emulsifier; all percentages being based on the total monomer weight.

2. The process of claim 1 in which the monovinylidene monomer comprises styrene.

3. The process of claim 1 in which the α,β-ethylenically unsaturated acid is methacrylic acid.

4. The process of claim 1 in which the α,β-ethylenically unsaturated acid is acrylic acid.

5. The process of claim 1 in which the ethylenically unsaturated ester comprises ethyl acrylate.

6. The process of claim 1 in which the ethylenically unsaturated ester comprises butyl acrylate.

7. The process of claim 1 in which the ethylenically unsaturated ester comprises methyl methacrylate.

8. The process of claim 1 in which the ethylenically unsaturated ester comprises 3-methylhexyl methacrylate.

9. The process of claim 1 in which the ethylenically unsaturated ester is copolymerized in an amount of at least 20 percent of the total polymer weight.

10. The process of claim 1 in which the monovinylidene monomer comprises acrylonitrile.

11. The process of claim 1 in which the weight of the α,β-ethylenically unsaturated acid is from about 2 to about 5 percent of the total monomer weight.

12. A latex composition comprising a stable aqueous dispersion of water insoluble copolymers of monomers consisting of from about 1 to about 10 percent by weight of an α,β-ethylenically unsaturated carboxylic acid, from 15 to 99 percent by weight of at least one ethylenically unsaturated ester selected from the group consisting of the cyclohexyl esters and the alkyl esters of acrylic acid and of methacrylic acid, the said alkyl esters having from 1 to 18 carbon atoms in the alkyl radical, and any balance of the monomer composition consisting of at least one monovinylidene monomer of the formula $$CH_2=C-Q$$
$$|$$
$$R$$

wherein R is selected from the group consisting of hydrogen and methyl and Q is selected from the class consisting of the radical —CN and an aromatic hydrocarbon radical having from 6 to 12 carbon atoms; said aqueous dispersion containing a water-soluble emulsifier, predominantly of the anionic type, in an amount of from about 0.004 to about 0.1 percent by weight as the sole emulsifier; all percentages being based on the total weight of the copolymer in the latex.

References Cited
UNITED STATES PATENTS

| | | | |
|---|---|---|---|
| 2,388,600 | 11/1945 | Collins | 260—29.6 |
| 2,601,315 | 6/1952 | Morrison et al. | 260—27 |
| 2,753,318 | 7/1956 | Maeder | 260—29.6 |

MURRAY TILLMAN, *Primary Examiner.*

PAUL LIEBERMAN, *Assistant Examiner.*